Sept. 29, 1936.  F. W. REYNOLDS  2,055,593

ELECTRON DISCHARGE DEVICE

Original Filed Dec. 4, 1926

INVENTOR
F. W. REYNOLDS
BY
ATTORNEY

Patented Sept. 29, 1936

2,055,593

UNITED STATES PATENT OFFICE 2,055,593

ELECTRON DISCHARGE DEVICE

Frederick W. Reynolds, Grantwood, N. J., assignor to American Telephone and Telegraph Company, a corporation of New York Original application December 4, 1926, Serial No. 152,656. Divided and this application April 30, 1930, Serial No. 448,633

12 Claims. (Cl. 250—27.5)

This invention relates to electro-optical electron discharge devices, and more particularly to means for controlling the intensity of an electronic beam employed for scanning.

This application is a division of applicant's application Serial No. 152,656, filed December 4, 1926 which issued as Patent No. 1,780,364, dated November 4, 1930.

In accordance with this invention, a Braun tube modified in two principal respects is used at the transmitter for scanning. One modification consists in substituting an auxiliary electrode of a thin transparent film of platinum or other suitable material for the usual fluorescent screen, thus forming an electrically conducting and light transmitting electrode. A second modification consists in positioning immediately in front of the auxiliary electrode, a specially constructed multiple unit photoelectric element, whose function is to control the density or power of the cathode rays or beam within the tube.

Features of this invention, as will appear from the following detailed description and the appended claims, are per se of general application in the arts utilizing electron discharge devices.

Figure 1:
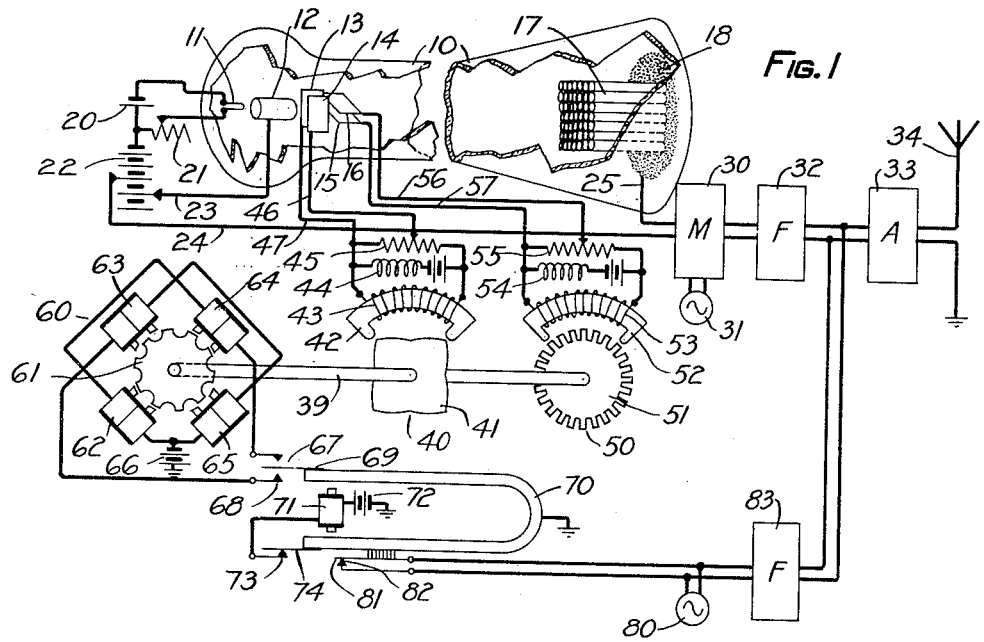
Figure 1 is a general schematic embodiment of a transmitting apparatus including the electro-optical device of this invention.

The modified Braun tube 10 of the transmitting apparatus shown in the schematic drawing Fig. 1 consists of an enclosing glass tube having a hot cathode 11, a beam focusing anode 12, two sets of electrostatic beam deflecting or directing plates 13, 14, and 15, 16, a multiple unit photoelectric element 17 comprising a large number of fine tubular units, and a light transmitting and electrically conducting auxiliary electrode 18 within the large end of the enclosing tube just in front of the element 17 where the image of the picture to be transmitted is focused. The photoelectric element may be made of a large number of closely compacted relatively fine and long glass or quartz tubes, as many tubes being necessary as are desired to divide the image into elements. The tubes may be held in position with some opaque cement, such as alundum, which also serves the purpose of preventing light from being reflected from one unit into adjacent ones. A film of rubidium, potassium, or other photoactive material is deposited on the inner walls of these tubular photoelectric units. The auxiliary electrode 18 may be a light transmitting conducting film of platinum on the inner side of one end of the tube 10, or on a separate transparent plate within the tube or it may be in the form of an open mesh screen of fine wires. When light impinges upon or an image of an object is focused at the ends of the photoelectric units adjacent to the auxiliary electrode, a part of the light falls upon the photoactive material within the photoelectric units. Cathode rays impressed upon the opposite end of the photoelectric units in any suitable manner are modulated or have their intensity changed in passing through the photoelectric units approximately in proportion to the intensity of the light falling upon a unit of the photoelectric element through which the cathode rays may be passing. A pulsating current flowing between the cathode 11 and the auxiliary electrode 18 will, therefore, be obtained from such a modified Braun tube upon scanning the photoelectric elements by a cathode beam or rays, which current has a frequency equal to the elementary frequency of scanning and a varying amplitude proportional at any instant to the light falling upon the element being scanned.

The filament 11 is heated by any suitable source of electric current such as the battery 20 and its temperature is controlled by the rheostat 21. The plate circuit of the tube is energized by a source of potential, such as the battery 22. The conductor 23 permits a variable positive potential to be applied to the anode 12. The conductors 24 and 25 leading to and from the apparatus immediately connected with the tube afford a connection of variable potential from the battery 22 to the auxiliary electrode 18. When the tube is energized, the electron flow within the tube takes place from the cathode 11 to the auxiliary electrode 18, passing through the anode 12 which assists in concentrating it into a beam, and between the directing plates. The beam directing electrodes 13, 14, and 15, 16, upon having an electrical potential applied thereto, direct the path of the beam the same as in a standard Braun tube. It is, therefore, obvious that by the proper application of potentials to the electrostatic directing plates, the cathode beam may be deflected to cause it to impinge on or scan any elemental area or unit of the photoelectric element 17. Magnetic deflecting means may obviously be used instead of the electrostatic means.

As the photoelectric element 17 permits the passage of cathode rays or electrons substantially in proportion to its light activation, and consequently the current which the cathode beam can pass at any instant depends upon the illumination to which a unit in the photoelectric element 17 through which it is passing is subjected, the current at any instant in the output circuit of this tube will, therefore, be substantially proportional to the illumination of an elemental area of the picture focused upon the photoelectric element of the tube.

The output circuit connects with the necessary apparatus for transmitting the photoelectric currents over any desired circuit or channel which is shown in the drawing as a radio channel. The transmitting apparatus includes such units as a modulator 30, an oscillator 31 for providing a carrier current, a filter 32, an amplifier 33 and an antenna 34 such as is used for substantially distortionless radio transmission.

In operating the tube in an electro-optical transmitting system, the cathode beam is caused to analyze an image of the object by successively scanning the elemental areas of the photoelectric element 17 under the influence of an electrostatic or magnetic field. As shown in the drawing, an electrostatic field is used and proper direction of the beam is caused by applying two alternating current voltages of different frequencies and proper wave shapes to the deflecting plates 13, 14, 15 and 16 within the tube 10. The scanning beam may be made to follow a spiral path as disclosed in A. McL. Nicolson Patent No. 1,470,696, dated October 16, 1923, or a series of substantially parallel paths over a rectangular area or any other suitable way.

The arrangement shown herein of applying to the elecrostatic beam directing plates two alternating currents of different frequencies and having suitable wave shapes causes the scanning of a rectangular area in substantially parallel lines. The varying voltages are applied to the beam directing plates by means of the low and the high frequency alternators 40 and 50, respectively. These alternators are preferably of the inductor type as indicated in the drawing. The alternator 40 consists of an inductor 41 having a small number of poles and a stator 42 on which is wound the armature and field exciting coil 43. The field excitation may be supplied by any suitable source and connected in series with the source is the inductance 44 which substantially suppresses the passage of alternating current and permits the coil 43 to serve as both field and armature winding. Separate coils, however, may be used for the armature and for the field windings. The armature winding 43 is connected to the potentiometer 45 for adjusting the voltage impressed on the output circuit. Conductors 46 and 47 connect the output of the alternator 40 with the electrostatic plates 14 and 13, respectively. The alternator 50 is somewhat similar to the alternator 40 but the former is designed to generate a current of very much higher frequency. Its armature 51 has a correspondingly larger number of poles than the armature 41. The stator 52 carries the armature and field winding 53. Field exciting current is supplied by any suitable direct current source through the choke coil 54 which prevents passage of alternating currents through the exciting circuit. The terminals of this alternator are connected to potentiometer 55 which in turn connects through the leads 56 and 57 with the electrostatic plates 16 and 15, respectively. The rotors of the two alternators are driven at a substantially uniform speed by a LaCour motor 60 or other suitable means. The rotating parts are all mounted upon the common shaft 39.

The LaCour motor may be of the usual type consisting of an armature 61 and field magnets 62, 63, 64 and 65 energized by a suitable source of current 66 which is intermittently applied through the contacts 67 and 68 and the contacting member 69 attached to the tuning fork 70. The tuning fork 70 is operated by means of the magnet 71, the battery 72, the contact 73 and the contacting member 74 attached to the tuning fork. The tuning fork causes the LaCour motor to operate at substantially constant speed as is well known in the art.

The transmitting and receiving apparatus must be operated in synchronism and in proper phase relationship and one way of accomplishing this is by means of a control circuit at the transmitting station governed by the tuning fork 70. The tuning fork is caused to modulate a carrier current generated by an oscillator 80. This may be effected by the contacts 81 and 82 associated with the tuning fork. The modulated output of the oscillator 80 passes through a suitable filter 83 and to the output amplifier 33 and to the antenna 34. The carrier frequencies for picture transmission and for synchronizing, as generated by the oscillators 31 and 80, respectively, are suitably chosen to avoid interference.

The alternator 50 has a frequency, for example, 100 times greater than that of the alternator 40. This difference in frequency causes the cathode beam to alternate between the electrostatic plates 15 and 16, 100 times while one alternation occurs between the electrostatic plates 13 and 14. This results in a substantially rectilinear vibratory scanning process covering a rectangular area. However, as already stated, any other suitable movement of the cathode beam may be employed.

Figure 2:
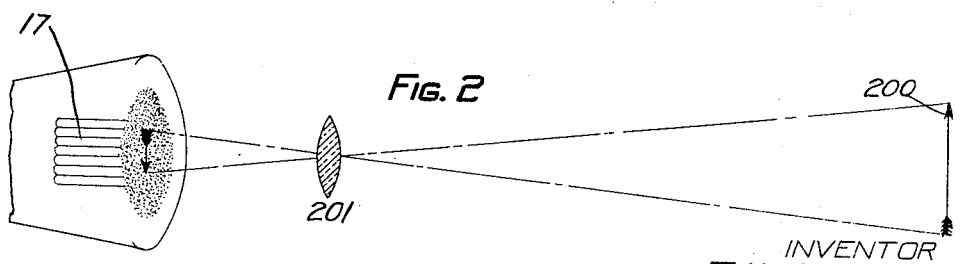
Fig. 2 is a diagrammatic drawing of a simple optical arrangement for focusing an image of an object on the transmitting tube.

A schematic drawing of a simple optical system showing the object to be scanned and the analyzing end of the transmitting tube is shown in Fig. 2. It consists primarily of a lens system for focusing an image of the object at the front end of the photoelectric element 17. The object 200 may be at any suitable distance and by means of the lens 201 the image of the object is focused in proper relation to the transmitting tube. The lens system may be similar to that used in a camera and any inverting or reversing of the image caused by the lens system can be corrected in the system by suitably arranging other elements of the apparatus.

The invention disclosed herein is susceptible to various modifications and adaptations without departing from the scope and spirit of the invention and it is not intended to limit the invention to the specific construction herein shown and described except as defined by the appended claims.

The term light is herein used to include not only electromagnetic waves of lengths to which the human eye is sensitive but also waves which are somewhat shorter or longer than those within the so-called visible spectrum.

What is claimed is:

1. An electron discharge device, comprising a cathode, an anode, an electron deflecting element, an auxiliary electrode, and photoelectric units in said device mounted between said deflecting element and said auxiliary electrode adapted to be luminously excited for modulating the discharge passing from the said cathode to the said auxiliary electrode in accordance with the light excitation of the said photoelectric units.

2. An electron discharge device comprising an electron emitting cathode, a bank of tubular impedance control elements, and means to receive electrons from said cathode controlled by said elements.

3. An electron discharge device comprising a discharge path, a plurality of impedance control elements in said path which freely emits electrons when excited by radiant energy of short wave length, and means for controlling each of said elements by such radiant energy impressed thereon independently of that received by the others.

4. An electron discharge device comprising a cathode, an anode, an electron deflecting element, an auxiliary electrode, and tubular shaped photoelectric units in said device adapted to be luminously excited for modulating the discharge passing from said cathode to the said auxiliary electrode in accordance with the light excitation of the said photoelectric units.

5. A space discharge device comprising an electron emitting cathode, an apertured anode electrically insensitive to light through the aperture of which electrons from said cathode pass, and a tubular element through which the electron discharge from said cathode through said aperture passes, the interior wall of said element being coated with material which freely emits electrons when excited by light.

6. An electron discharge device comprising an electron emitting cathode, means to receive electrons emitted from said cathode, a bank of apertured elements between said cathode and electron receiving means which elements are insulated from one another and through the apertures of which elements said received electrons pass, and electron emitting light sensitive material located on the surfaces of said elements surrounding said apertures.

7. An electron discharge device comprising an electron emitting cathode, means to receive electrons emitted from said cathode, a bank of tubes of insulating material between said cathode and electron receiving means, the received electrons passing through the insides of said tubes, and photoelectric light sensitive material located on the inside walls of said tubes.

8. An electron discharge device comprising an electron emitting cathode, means to receive electrons emitted from said cathode, a bank of tubes of insulating material between said cathode and electron receiving means, the received electrons passing through the insides of said tubes, and alkali metal located on the inside walls of said tubes.

9. An electric discharge device comprising a gas-tight receptacle, a light sensitive element therein comprising a support of insulating material carrying a large number of regularly arranged discrete portions of light sensitive material, and a second element therein spaced from said light sensitive element and in electrical cooperative relationship therewith.

10. A light sensitive electrode for an electro-optical device comprising a cellular structure of insulating material, and light sensitive material within the cells of said structure, the light sensitive material in one cell being insulated from that in the other cells by the insulating material of the structure.

11. An electron discharge device comprising an electron emitting cathode, a cellular structure of insulating material, light sensitive material within the cells of said structure, and means to receive electrons from said cathode controlled by said light sensitive material.

12. An electron discharge device comprising an electron emitting cathode, a light transmitting anode adapted to receive electrons emitted from said cathode, and a plurality of light sensitive impedance control elements in the paths of electrons that are to move in a line between the cathode and anode.

FREDERICK W. REYNOLDS.